J. S. JACOBS.
DEVICE FOR FEEDING RAGS AND THE LIKE.
APPLICATION FILED FEB. 26, 1917.
1,300,840.
Patented Apr. 15, 1919.
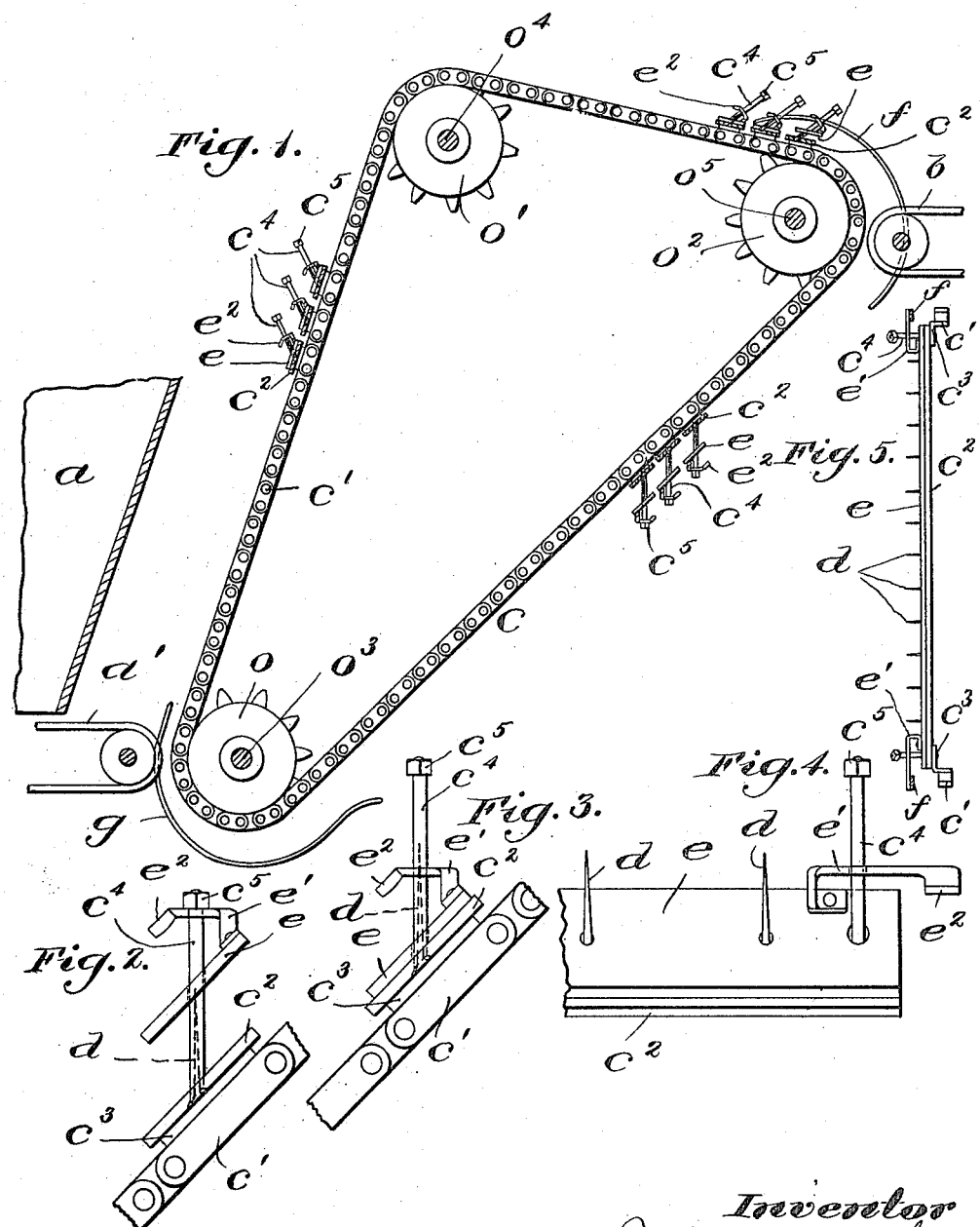

UNITED STATES PATENT OFFICE.

JULIAN S. JACOBS, OF SPRINGFIELD, VERMONT, ASSIGNOR TO JOHN T. SLACK CORPORATION, OF SPRINGFIELD, VERMONT, A CORPORATION OF VERMONT.

DEVICE FOR FEEDING RAGS AND THE LIKE.

1,300,840.  Specification of Letters Patent.  Patented Apr. 15, 1919.

Application filed February 26, 1917. Serial No. 151,077.

*To all whom it may concern:*

Be it known that I, JULIAN S. JACOBS, citizen of the United States, and resident of Springfield, Vermont, have invented certain new and useful Improvements in Devices for Feeding Rags and the like, of which the following is a specification.

This invention relates to feeding devices such as are intended for use in feeding rags, waste or other stock into picker machines or like apparatus used for disintegrating the rags or other material preparatory to manufacturing them into shoddy, paper or the like.

In feeding the rags or other material to the picker it is highly desirable that the material to be shredded should be delivered onto the intake table or apron of the picker machine as uniformly as possible, but the tendency of the rags or other stock to gather in bunches or rolls on the feed conveyer has heretofore necessitated the close attention of an operator to secure a proper delivery of the material. It is the object of the present invention to overcome this difficulty by providing a device which shall be capable of taking the material from the hopper into which it is dumped and deliver it to the picker machine free from objectionable bunches or rolls without requiring the constant attention of an operator.

To this end the invention consists in a traveling carrier or conveyer provided at frequent intervals with sharpened spikes for engaging the stock to be fed combined with doffing members arranged in close proximity to the spikes and movable at a predetermined point in the travel of the conveyer into a position to strip the material from the spikes, the doffing members being returned to inoperative position thereafter to allow the spikes to successively engage and feed additional material.

This and other features of the invention will be described in this application and will be defined in the claim annexed hereto.

In the drawings: I have illustrated a simple and convenient form of the invention designed to operate as indicated, in which, Figure 1 is a side elevation with parts in section showing the traveling conveyer provided with the spikes and with the doffing members in different positions at different parts of their travel.

Figs. 2 and 3 are enlarged end views showing portions of the conveyer with a single doffing member in doffing position and inoperative position, respectively.

Fig. 4 is an enlarged front elevation of a portion of one of the doffing members.

Fig. 5 is a plan view transversely of the conveyer showing the doffing member at rest.

In the practice of my invention as shown the traveling or endless conveyer $c$ is shown as consisting of two sprocket chains $c'$ arranged side by side and spaced apart according to the desired width of the feed device, and carrying transverse connecting slats $c^2$ closely arranged in parallelism to form supports for rows of sharpened spikes $d$ which are embedded or secured in said slats so as to project outwardly a sufficient distance from the surface of the conveyer to engage the rags or other stock to be fed. These parallel sprocket chains pass over sprocket wheels $o$, $o'$, $o^2$ mounted on a horizontal shaft $o^3$, $o^4$, $o^5$ suitably arranged so that the conveyer travels upwardly from the receiving end, thence across to the intake member $b$ of the picker machine, which may be either a table or a feed apron.

Each slat or transverse member of the conveyer is secured to the sprocket chains in any suitable manner, for example, by angle brackets $c^3$ at each end to form a connection between the slat and the adjacent link of the sprocket chain. Each slat is also provided with a projecting guide pin $c^4$ at each end which projects upwardly in parallelism with the spikes $d$. At its outer end each guide pin $c^4$ has a head or nut $c^5$ to form a stop to limit the movement of the doffing member outwardly.

The doffing member in this case is shown as a plain perforated plate or bar $e$ provided with apertures for receiving the feed spike $d$ and also with apertures for receiving the guide pins $c^4$ but the particular form of the doffing member is not essential. Each doffing member is also provided with a bracket $e'$ which projects laterally beyond the sides of the conveyer and is preferably formed with a lip $e^2$ for engaging a track or lifting member $f$, one of which is arranged on either side of the conveyer adjacent to the point of delivery so as to engage the bracket $e'$ forming part of the doffing member to move it outwardly in order to strip the material from the spikes at the delivery point of the conveyer travel. The bracket $e'$ is preferably perforated to receive and engage the guide pins $c^4$ so as to coöperate with the perforation in the plate $e$ in order to maintain the parallelism of the doffing member in its different positions of movement and prevent binding against the guide member $c^4$.

At the lower end of the carrier adjacent to the receiving point a pair of curved doffer engaging members or tracks is arranged in position to engage the outside face of the bracket $e'$ in order to return the doffing members to idler or inoperative position so as to permit the adjacent spikes to penetrate and hold the material delivered to them.

The operation of the device is as follows: The rag or other stock is dumped into the hopper $a$ from which it projects onto a feed apron $a'$ which delivers it to the conveyer $c$. Each successive row of spikes engages the rags from the feed apron $a'$ and draws them out to an approximately flat or extended position through the ascending part of the travel between the sprocket wheels $o$, $o'$. Thence the material is carried across the upper part of the travel so as to approach the intake member or apron $b$ of the picker. As the successive rows of spikes approach their point of delivery to the picker intake, the successive doffing members coöperating with said row of spikes is moved upwardly so as to strip the rags from the spikes at a point where the rags will be free to fall upon the picker intake. The stripper or doffing members will remain in stripping position under the influence of gravity during its downward travel until it approaches the coöperating members $g$ which, by engaging the outer face of the projecting portion $e'$ returns the stripping member to normal or inoperative position. The nuts or heads $c^5$ serve to prevent the doffer members from dropping from the conveyer while by unscrewing these nuts any doffing member may readily be removed for replacement or repairs.

It will be observed that the stripping or doffing members are positively moved out to and beyond the extreme ends or points of the spikes by reason of their engagement with the track or lifting member $f$ so that the doffing is reliably accomplished no matter how tightly any of the rags may be impaled upon the spikes. It will also be observed that the doffing or stripping members are positively returned to position by engagement with the lower track members $g$.

What I claim is:

A feed device of the class described embracing an endless carrier provided with successively arranged series of transverse rag-engaging spikes, a series of movable doffing members normally resting upon the carrier adjacent to the base portions of said spikes, and means for positively moving said doffing members outwardly to the points of said spikes in order to completely disengage from said spikes the rags impaled thereon, substantially as described.

In witness whereof, I have subscribed the above specification.

JULIAN S. JACOBS.